United States Patent [19]

Rutschilling

[11] 4,389,930
[45] Jun. 28, 1983

[54] PRESSURE SENSING LATCH FOR A ROUND BALER

[75] Inventor: Paul C. Rutschilling, Coldwater, Ohio

[73] Assignee: The Paul Revere Corporation, Greenwich, Conn.

[21] Appl. No.: 283,045

[22] Filed: Jul. 13, 1981

[51] Int. Cl.³ ............... B30B 5/06; A01D 39/00
[52] U.S. Cl. .................... 100/88; 100/99; 56/341; 292/201; 292/341.14
[58] Field of Search ............ 100/88, 89, 99; 56/10.2, DIG. 15, 341, 342, 343, 344; 292/201, 341.15, DIG. 44

[56] References Cited
U.S. PATENT DOCUMENTS 3,338,612  8/1967  Howard ............... 292/DIG. 44
3,968,633  7/1976  Gaeddert et al. ............ 56/341
3,974,632  8/1976  van der Lely ............ 100/88 X
4,009,653  3/1977  Sacht ............... 100/88
4,246,743  1/1981  Anstee et al. ............ 100/99

Primary Examiner—Peter Feldman
Attorney, Agent, or Firm—Robert J. McNair; Abraham Ogman

[57] ABSTRACT

A latch mechanism is presented which is useful with a machine which gathers crop material from a windrow and forms it into large round bales. The latching mechanism senses bale density while holding the opposing faces of the tailgate closed during the bale forming operation. Density is sensed by spring mounting the latch slides so that the tailgate comes slightly ajar when pressure in the baling chamber builds up. The amount of separation of the opposing faces of the tailgate is sensed and when it exceeds a specified amount, initiates a bale discharge sequence. The tailgate lifting mechanism is interlocked with the latch release to assure safe operation of the system.

9 Claims, 4 Drawing Figures

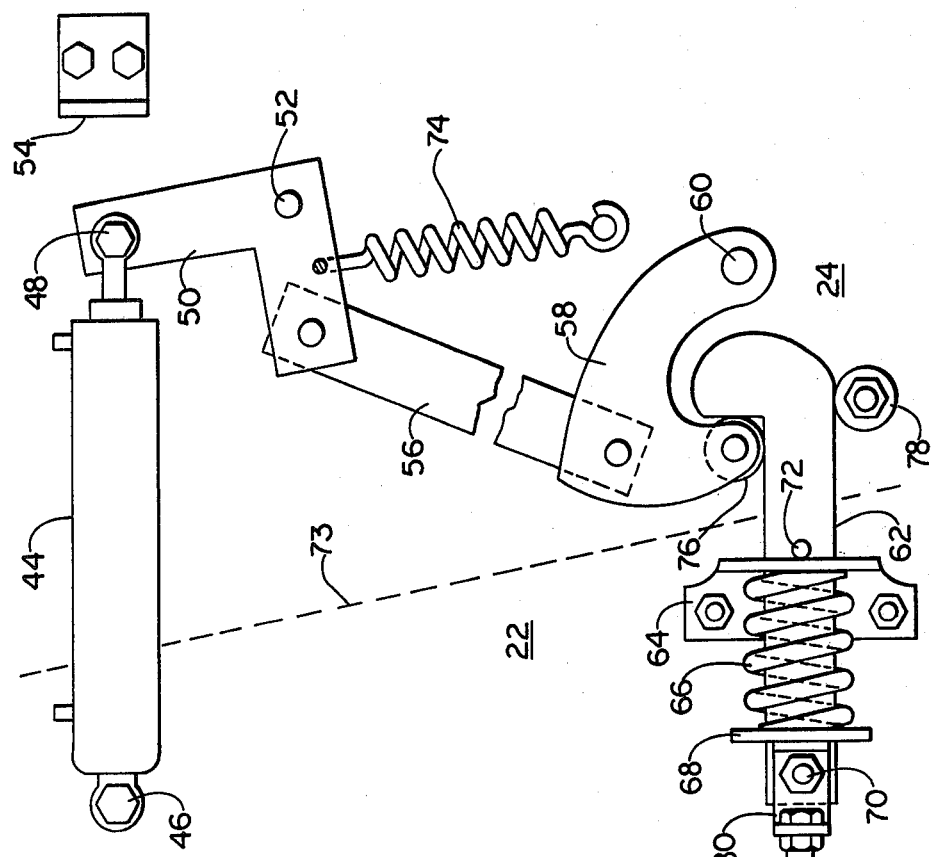
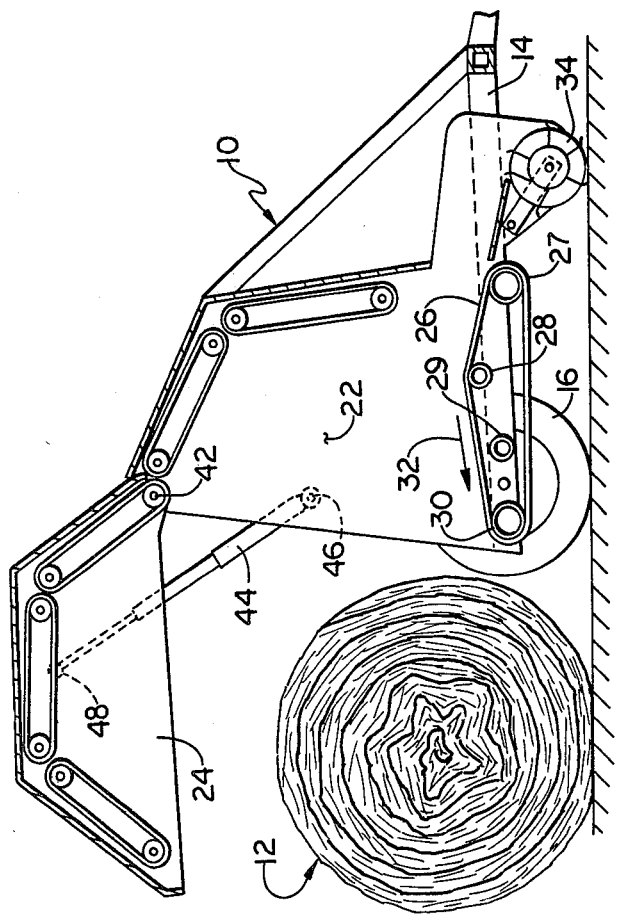

PRESSURE SENSING LATCH FOR A ROUND BALER

BACKGROUND OF THE INVENTION

This invention relates to a machine for forming large round bales of fibrous agricultural crops. More particularly, I provide a latching mechanism which senses the pressure being applied to compress the bale while at the same time holding the bale discharge gate closed.

An application titled "Latching Mechanism for a Round Baler" having Ser. No. 282,548 and assigned to the same assignee is made copending with this one by simultaneous submission.

Many bale forming machines exist which form fibrous agricultural crops into bales that are either twine or wire tied. For example, the U.S. Pat. No. 4,009,653 to Sacht discloses a method for forming large round bales in a machine comprising a cage-like frame having a horizontal axis and a generally cylindrical shaped baling zone. Upwardly extending machine sidewalls form the confining end surfaces of the baling zone. A plurality of serially arranged conveying elements enclose and generally define the circumferential periphery of the baling zone. Thus, the size of the baling chamber remains constant during the bale forming process. To accomplish discharge of a completed bale, the baling chamber is divided into two portions approximately along a vertically extending axis cutting plane. The rear portion of the housing is then configured to swing upward from a hinge point at the top, thereby allowing the bale to be discharged rearward.

The U.S. patent application having Ser. No. 162,372, now U.S. Pat. No. 4,319,446, and assigned to the same assignee as this application discloses bale forming means which differ somewhat from the implementation of Sacht. Two additional rollers are added to support the bottom conveyor belts. As viewed from the side the improved system shows four rollers on which a plurality of laterally spaced belts are trained. The second and third rollers (which are respectively in the forward and aft portions of the conveyor midsection) and the fourth roller (which is at the rear of the machine) are disposed to be generally on the cylindrical periphery of the baling zone. The first roller is in front of and somewhat below the plane containing the axis of the third roller. The Arnold etal, invention improves on Sacht in two ways. First, the vertical dimension of the entrance throat is enlarged. This allows the baler to operate in a heavier stand of hay without becoming clogged. Second, by lowering the placement of the front roller, a pickup reel of smaller diameter can be used. This permits the flow of hay being picked up from the windrow to pass into the baling zone without undergoing abrupt changes in direction. The laterally spaced conveyor belts accept the crop material being passed on from the pickup reel and frictionally engage the crop strands to provide inward directed pressure to carry them into the baling zone.

This invention is shown in conjunction with a baler having a bottom conveyor member for receiving agricultural material which is constructed similar to that disclosed in the U.S. patent application having Ser. No. 162,372. Using this type of bottom conveyor, generally cylindrical bales are formed in a cavity of fixed size. The partially completed bale rotates on a horizontal axis while crop material picked up from a windrow is continuously added to the periphery of the bale. As the baling chamber fills, pressure is exerted on the surrounding enclosure. The enclosure is hinged along the top edge to allow the rear portion to open upwardly to enable discharge of a completed bale. I provide a latch mechanism to hold the opposing faces of the enclosure together until the bale is complete.

With my invention the tailgate is mechanically locked in the closed or baling position by adjustable spring loaded latches, one on each side of the baler. As the baling chamber fills, pressure on the tailgate causes a latch slide to compress a spring. Excursion of the latch slide gradually forces the tailgate to come away from its nesting position by as much as an inch. The movement of the tailgate in response to internal pressure is monitored by mechanical and/or graduated electrical sensors to generate visual and audible indications of the bale forming status. Latch release is interlocked with the hydraulic door cylinder linkage which actuates at the initiation of the bale discharge sequence. With my implementation there are no hydraulic pressure gauges to be monitored and small hydraulic leaks will not effect performance.

SUMMARY OF THE INVENTION

It is an object of this invention to provide a latching mechanism which senses when the bale density has reached a specified level. It is another object of the invention to provide the machine operator with a signal that the bale is ready for discharge from the baling chamber.

The baler with which the latching mechanism was first reduced to practice forms generally cylindrical bales in a chamber of fixed size. During the bale forming process, the partially completed bale rotates on a horizontal axis while crop material picked up from a windrow is continuously added to the periphery of the bale. As the baling chamber fills pressure is exerted on the peripheral elements of the enclosure. The enclosure is hinged along the top edge to allow the rear portion to swing upward, forming thereby a tailgate through which a completed bale can be discharged.

The latch mechanism holds the opposing front and rear portions of the enclosure together during the bale forming operation. Two latches are used, one on each side, near the bottom juncture of the enclosure. Each latch is mechanically interlocked with a hydraulic cylinder which spans the front to rear faces of the baler sidewalls near a mid-height location. These cylinders are operated in synchronism from the tractor hydraulic system and serve to raise and lower the tailgate. By interlocking each latch mechanism with that hydraulic cylinder which is on the same side of the baler, latch release is assured before the piston of the hydraulic cylinder extends to raise the tailgate. Since the hydraulic cylinders are energized in parallel, the latches will release in synchronism.

Each latching mechanism includes components, some of which are secured to the front sidewall of the baler and some of which are secured to the rear sidewall of the baler. On the front is a bracket which is secured to the sidewall. A latch slide projects rearward through an aperture in the bracket. The latch slide is spring loaded against the bracket and retained in position by keeper pins. The rearmost end of the latch slide extends beyond the rear edge of the front sidewall and terminates in an offset knob. A locking hook journalled at one end to the lower rear sidewall is positioned so that its second end engages the knob portion of the latch slide.

When the locking hook and the latch slide on both the left and right sides of the baler are locked together, the tailgate is held in the closed condition. As the baling chamber fills with crop material, pressure is exerted on the latches. The spring loaded latch slides extend under this pressure allowing the tailgate to come slightly ajar. As the pressure from the baling chamber builds up, the gap between the front and rear edges of the lower sidewalls becomes larger due to compression of the springs. The magnitude of the gap is sensed and when it exceeds a predetermined value, the bale discharge sequence in initiated.

The first thing that is done in the bale discharge event is the release of the tailgate latches. This is done by mechanically interlocking the latching hooks and the hydraulic cylinders used to raise the tailgate. By interlocking the two functions, the latch assemblies are disconnected whenever the hydraulic cylinders are energized to raise the tailgate. Lowering the tailgate after discharge of the bale has been completed results in reclosure of the latches.

DESCRIPTION OF THE DRAWINGS

FIG. 2 is a cutaway right side view of the baler showing the layout of the conveyor assemblies which surround the baling chamber.

FIG. 3 is a side view of the latch assembly positioned for the case where the baler tailgate has just been closed.

DESCRIPTION OF THE PREFERRED EMBODIMENT

Figure 1:
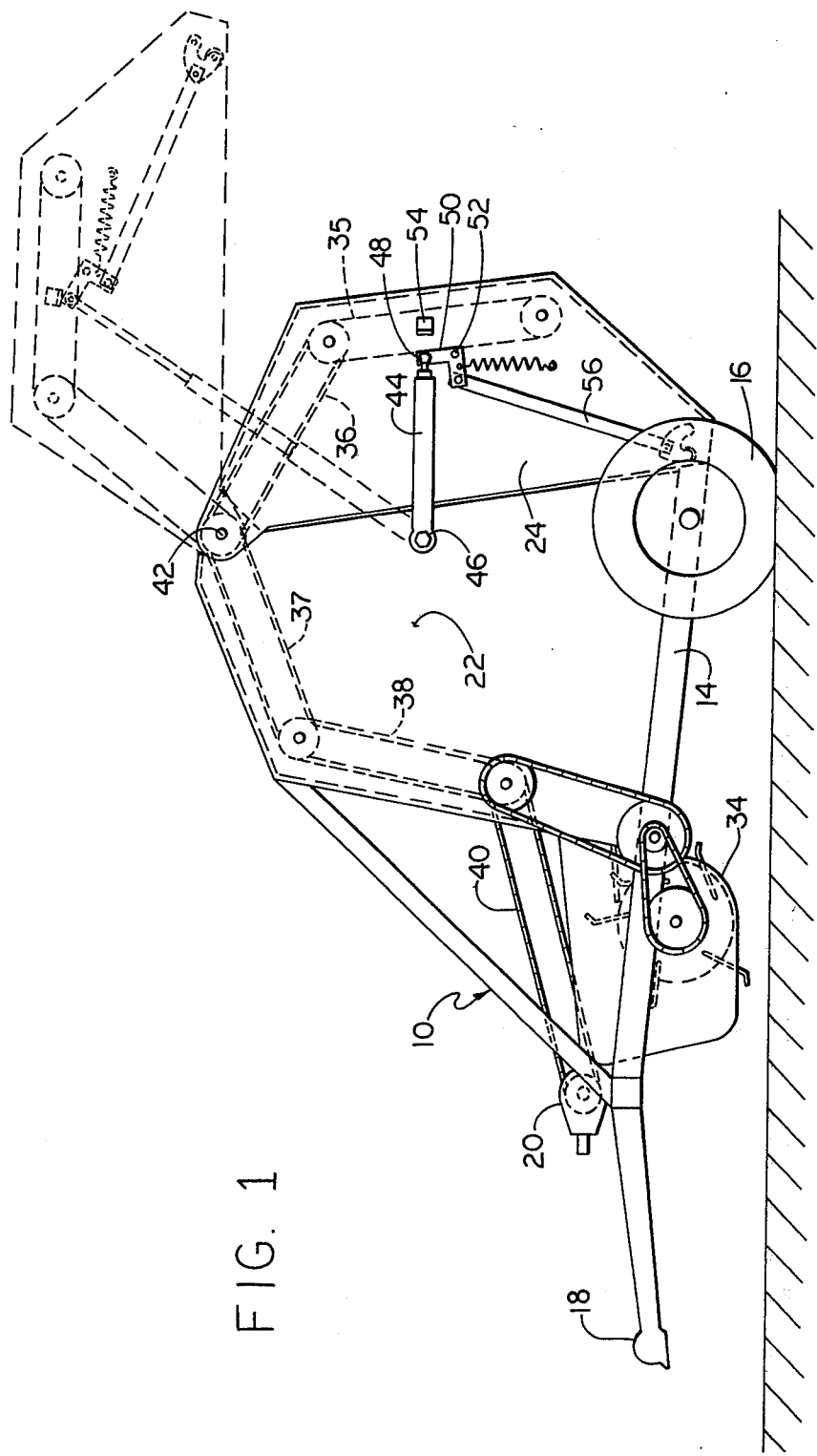
FIG. 1 is a left side view of a baler which incorporates the latch assembly.

In FIG. 1, there is shown a baler 10 which is conventional in all respects with the exception of the tailgate latch assembly. Baler 10 forms cylindrically shaped round bales 12 (See Fig. 2) from windrowed fibrous crop material. The machine consists of a single axle chassis 14 supported on wheels 16 and tractor hitch 18. A gear box unit 20 receives operating power from the tractor via a power take off shaft (not shown).

The baling chamber is divided into two parts. There is a front part having front sidewall 22 and a rear part having rear sidewall 24. As shown in the cutaway view of FIG. 2, the circumference of the baling chamber is surrounded by a number of conveyor assemblies. The bottom conveyor 26 is comprised of a multiplicity of side by side belts which are entrained on four transversely extending parallel rollers 27, 28, 29 and 30. The bottom conveyor is powered to move rearward as shown by arrow 32, carrying crop material into the baling chamber that has been gathered by pickup reel 34. Above the bottom conveyor, there are a number of other conveyor elements. FIG. 2 shows three in the rear part and two in the front part. In the unit reduced to practice, all upper conveyor assemblies were alike. Each was comprised of a multiplicity of side by side belts entrained on a pair of transversely mounted rollers. The downstream roller of each pair was powered by a sprocket and chain drive as shown in FIG. 1 where chains 35, 36, 37 and 38 serially receive power from one another and from gear box 20 via chain 40. Pickup reel 34 is powered from the same source.

At the upper end of rear sidewall 24, the rear part of the baling chamber is journalled at the axle of roller 42 so that it can be pivoted or swung upward approximately 90 degrees into the discharge position shown dotted in FIG. 1. Raising and lowering of the rear part around the pivot point is accomplished by hydraulic cylinders 44, one on each side of the baler. The front end of hydraulic cylinder 44 is rotatably anchored in front sidewall 22 by bolt 46. The second end is secured by bolt 48 to one arm of bell crank 50 whose center is attached to rear sidewall 24 by bolt 52. The bell crank serves to actuate the latch which secures the rear part of the baler to the front.

It will be understood that there are identical latch assemblies on each side of the baler. Those latch assemblies are released when cylinders 44 are energized to raise the rear tailgate. FIGS. 1 and 3 show how the latch assemblies operate. The second arm of bell crank 50 is connected via a coupling rod 56 with locking hook 58. The locking hook is journalled at one end to the lower rear sidewall 24 by pin 60. The second end of locking hook 58 is positioned so as to engage the knob end of latch slide 62. Latch slide 62 is secured to front sidewall 22 by means of bracket 64 which has an aperture therein, through which the central barrel of latch slide 62 can readily move. To the left of bracket 64 as seen in FIG. 3, is a multiple turn coil spring 66 and a keeper washer 68 which together with stop bolt 70 tend to hold the latch slide 62 so that keeper pin 72 rests against the face of bracket 64. Spacer shims can be inserted between keeper washer 68 and multiple turn coil spring 66 to attain exact preloading of latch slide 62 when engaged by locking hook 58. Keeper pin 72 is positioned such that latch slide 62 extends far enough past the rear edge of part 22 (See dashed line 73) to allow the knob end thereof to be engaged by locking hook 58. Tension spring 74 ensures a constant automatic locking action. A roller 76 on the locking hook 58 serves to minimize friction between the mating surfaces. Roller 78 secured to sidewall 24 helps to keep latch slide 62 properly aligned, counteracting the latch closing force of spring 74.

When it is desired to open the tailgate of the baler, hydraulic pistons 44 will be actuated. As they extend, bell crank 50 will rotate around bolt 52 until the upper arm intercepts block 54. This movement of the bell crank raises the latching hook 58 sufficiently so that it clears the knob end of latch slide 62. With the latches on both sides of the baler thus disengaged, subsequent extension of pistons 44 serves to raise the tailgate to the position shown in FIG. 3.

Figure 4:
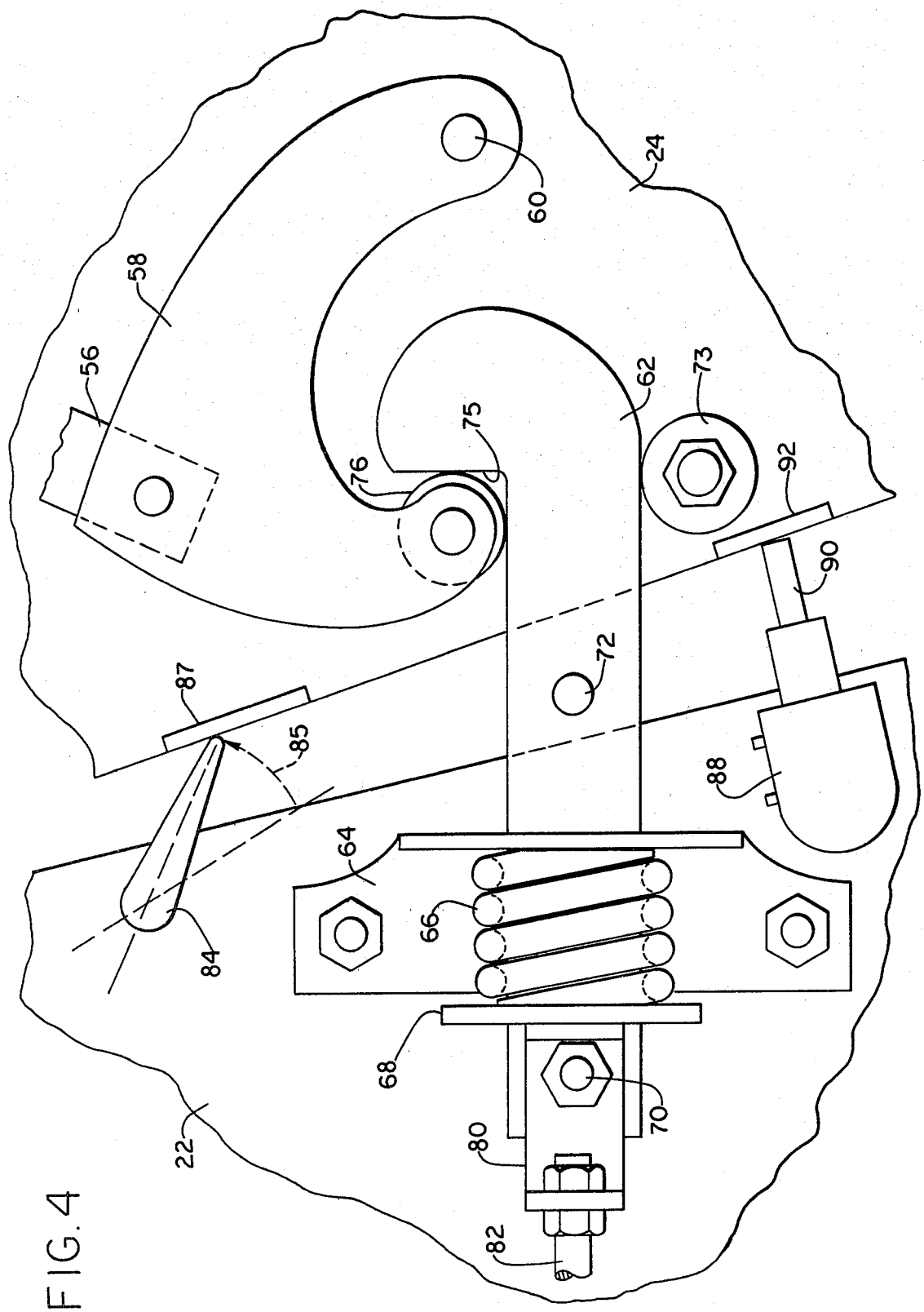
FIG. 4 is an enlarged view of the latch mechanism showing its elongated status representative of the baling chamber being filled with hay.

The spring loaded latch slide shown in FIG. 3 enables a function to be accomplished which was not possible with prior art machines. This has to do with sensing of the quantity of crop material that is in the baling chamber. As the bale grows in size, the belts surrounding the periphery of the chamber begin to exert an inward directed pressure on the bale. As the pressure increases, the latches holding the tailgate closed, receive more strain. My invention allows this strain to be measured. FIG. 4 shows the means for accomplishing this. Longitudinal strain on latch slide 62 compresses spring 66 allowing baler sidewall 24 to pull away from front sidewall 22. By positioning pin 60 so that a line drawn from the center of pin 60 through the center of roller 76 is perpendicular to face 75 of the latch slide knob, there will be no tendency for the locking hook to come disconnected under the strain.

The compressive strain on latch slide 62 is resisted by bracket 64 and stop bolt 70 which backs keeper washer 68. Additionally, stop bolt 70 secures one end of U-shaped bar 80 to the end of latch slide 62. The second end of U-shaped bar 80 has mounted therein piston rod 82 of damping cylinder 84 which is secured to sidewall 22 by bolt 86 (See FIG. 3). The purpose of damping cylinder 80 is to absorb the energy stored in spring 66 when the latch is released by drawing latching hook 58 out of engagement with the knob on the end of latch slide 62. Without damping cylinder 84, latch slide 62 would clang back on release, propelled by the stored energy in the spring 66. However, using a damping cylinder of the type used as shock absorbers for automobiles, piston 82 can easily be drawn out as spring 66 is compressed. Then, on release of the latch, piston 82 resists quick expansion of the spring.

The compression of spring 66 due to the pressure being exerted within the baling chamber causes the rearmost part of the baler to draw away from the front. The tailgate comes ajar and sidewall 24 separates from sidewall 22 as shown in FIG. 4. The amount of sidewall separation can be measured by at least two methods. One is the angularly moving arm 84 which acts against striker plate 87. When arm 84 is spring biased against striker plate 87, the arc 85 through which the arm travels can be mechanically transferred and amplified as necessary to visually inform the machine operator of the status of the bale. Alternately, an electrical type of off-on switch 88 can be used. Central plunger 90 of the switch is spring actuated to rest against striker plate 92. When sidewalls 22 and 24 separate by some predetermined amount, switch 88 is turned "on". Turning "on" of switch 88 can be used for several things. It can energize a warning light and/or a horn. Either of these will signify to the operator that the progress of the baler along the windrow should be halted and the bale discharge event completed.

It is also possible to use the sensor to automatically initiate the discharge sequence. Triggering of switch 88 could start the bale tying sequence preparatory to opening the tailgate wide for bale discharge. My mechanical bale density indicator is both simple and reliable. Its availability eliminates the hydraulically instrumented pressure sensors used in the prior art balers.

While the invention has been described in conjunction with a baler which produces large round bales, it will be understood that it can be of equal utility in other embodiments. Various changes in the details, materials, steps and arrangement of parts may be made and will occur to those skilled in the art upon a reading of the above disclosure. Therefore, the invention should not be limited to the specific illustration disclosed, but only by the following claims.

I claim:

1. A latching mechanism for use with a baler comprising:
   a bale forming cavity defined by peripheral elements having at least one wall member that can move relative to another;
   a latching assembly having a first latch member secured to said moveable wall member and a second latch member secured to the other, the first latch member and second latch member being engageable to secure the moveable wall member from moving relative to another;
   means associated with said latching assembly for enabling said latch members to partially disengage in response to a predetermined pressure on said moveable wall member;
   means responsive to said partial disengagement to signal that the predetermined pressure has been achieved; and
   means for totally disengaging said latch members to permit said cavity members to move relative to one another.

2. A latching mechanism for use with a baler comprising:
   a bale forming cavity defined by peripheral elements having at least one wall member that can move relative to another to form a tailgate for removing said bale from said cavity;
   a latching assembly having a first latch member secured to said tailgate and a second latch member secured to another wall member, the first and second latch members being engageable to secure the tailgate;
   means associated with said latching assembly for enabling said latch members to partially disengage in response to a predetermined pressure on said tailgate;
   means responsive to said partial disengagement to signal that the predetermined pressure has been achieved; and
   means for totally disengaging said latch members to permit said tailgate to open to discharge a bale.

3. A latching mechanism as defined in claim 2 wherein the tailgate is spring-biased to move after a predetermined pressure is reached.

4. The latching mechanism as defined in claim 2 wherein the means responsive to said partial disengagement to signal that the predetermined pressure has been achieved includes an arm which is spring biased against a striker plate to mechanically present the completion status of the bale.

5. The latching mechanism as defined in claim 2 wherein said second latch member secured to another wall member includes:
   a bracket having an aperture therein, said bracket being secured to said wall member;
   a latch slide having a central barrel, an enlarged knob at its first end and a transverse opening adjacent its second end, the second end being inserted through said aperture in said bracket;
   a multiple turn coil spring having its base nested against said bracket with the main body of the spring surrounding the central barrel of said latch slide,
   a keeper washer positioned over the second end of each latch slide adjacent the second end of said coil spring;
   a stop bolt mounted in the transverse opening in the latch slide; and
   a keeper pin secured in the mid-barrel region of the latch slide adjacent that side of the bracket which is opposite the side against which the coil spring is based, the keeper pin being positioned such that the latch slide extends far enough past the edge of said another wall member to enable said knob end to be engaged by that portion of said latching mechanism which is secured to said tailgate.

6. The latching mechanism as defined in claim 5 wherein spring preloading means are provided by inserting spacer shims between said multiple turn coil spring and said keeper washer.

7. The latching mechanism as defined in claim 5 wherein one end of a locking hook is secured to said tailgate, the second end of said locking hook being configured to engage the knob end of said latch slide, operation of said locking hook being interlocked with the means for totally disengaging said latch members.

8. The latching mechanism as defined in claim 7 wherein the means for totally disengaging said latch members includes:

a hydraulic cylinder, one on each side of the baler, the front end of each hydraulic cylinder being rotatably anchored to said another wall member;

a bell crank having its center rotatably secured to said tailgate wall member, one arm of said bell crank being rotatably secured to the second end of said hydraulic cylinder, the second arm of said bell crank being connected via coupling rod to said locking hook, the arc-like movement of said bell crank on actuation of said hydraulic cylinders serving to raise the latching hooks sufficiently to disengage said hooks from said latch slides.

9. The latching mechanism as defined in claim 2 wherein the means for totally disengaging said latch members includes means for dampening the energy stored in said members prior to disengagement.

* * * * *